(12) United States Patent
Arvin

(10) Patent No.: US 7,046,241 B2
(45) Date of Patent: May 16, 2006

(54) ORIENTED THREE-DIMENSIONAL EDITING GLYPHS

(75) Inventor: Scott A. Arvin, New Boston, NH (US)

(73) Assignee: Autodesk, Inc., San Rafael, CA (US)

( * ) Notice: Subject to any disclaimer, the term of this patent is extended or adjusted under 35 U.S.C. 154(b) by 271 days.

(21) Appl. No.: 10/020,350

(22) Filed: Dec. 12, 2001

(65) Prior Publication Data
US 2003/0107567 A1 Jun. 12, 2003

(51) Int. Cl.
G06T 15/00 (2006.01)

(52) U.S. Cl. ............... 345/419; 345/441; 345/664; 345/467; 345/468

(58) Field of Classification Search ........... 345/419, 345/441, 468, 664, 467, 471
See application file for complete search history.

(56) References Cited

U.S. PATENT DOCUMENTS 5,588,098 A * 12/1996 Chen et al. ............... 345/653
5,734,805 A    3/1998 Isensee et al.
6,046,749 A    4/2000 Andersson

* cited by examiner

Primary Examiner—Kimbinh T. Nguyen
(74) Attorney, Agent, or Firm—Gates & Cooper LLP

(57) ABSTRACT

One or more embodiments of the invention provide a method, apparatus, system, and article of manufacture for indicating available modifications to a geometric object in a computer drawing program. A three-dimensional geometric object is displayed in a computer drawing program. Additionally, an oriented three-dimensional glyph is displayed. The oriented three-dimensional glyph provides a direct visual indication of valid movement direction during direct manipulation of the three-dimensional geometric object.

21 Claims, 5 Drawing Sheets

US 7,046,241 B2

ORIENTED THREE-DIMENSIONAL EDITING GLYPHS

BACKGROUND OF THE INVENTION

1. Field of the Invention

The present invention relates generally to computer drawing programs, and in particular, to a method, apparatus, and article of manufacture for displaying a visual indicator that indicates potential object manipulations in the computer drawing program.

2. Description of the Related Art

Computer-implemented graphics systems have been widely used by designers, illustrators, drafters, and engineers for a number of years. Most such graphics systems use a two-dimensional (2D) graphical user interface (GUI) to display graphical images, such as 2D or three-dimensional (3D) models, schematic diagrams, photorealistic images, etc.

Subsequent to placement of a graphical object in a drawing, a user often manipulates the graphical object (e.g., by resizing, rotating, stretching/expanding, shortening, etc.). To assist in a manipulation, the system may provide for the use of a glyph or a grip. A glyph is a symbol that conveys information non-verbally. A grip is a glyph that has a defined position and an active area within which a pointing device will "snap" to that position. To manipulate the system, a user selects the grip or glyph and drags the cursor in a desired direction. The underlying graphical object is then manipulated based on the grip limitations and the drag operation.

Grip glyphs have been used extensively in two-dimensional graphic editing, and more recently in three-dimensional model editing. However, in prior art techniques, a user must determine from the position of a grip glyph what a resulting action will be. Thereafter, the user must determine a valid direction constraint, usually by experimentation. FIG. 1 illustrates grip glyphs as used in the prior art. As illustrated, a door graphical image/object 100 has numerous square grip glyphs 102–108. The user must first guess and then experiment to determine what each grip 102–108 does and how the grip 102–108 may be used based on the grip's 102–108 location within door object 100. For example, since grip 102 and 106 are in corner positions, the user may guess and then experiment to determine that grips 102 and 106 may be used to change the width (and maybe the height) of door object 100. Further, since grips 104 and 108 are located in the middle of door object 100, the user may guess and experiment to determine that grip 104 may be used to change the location and grip 108 may be used to change the opening angle of door object 100, and since grips 110 and 112 are located at the top corners of door object 100, the user may guess and experiment to determine that grips 110 and 112 may be used to change the height of door object 100.

Thus, as illustrated in FIG. 1, the prior art square grip glyphs 102–108 do not provide sufficient information to enable a user to quickly (and without experimentation) determine which grip glyph 102–108 to use to accomplish a desired task.

In data visualization fields, glyphs may be oriented to provide a visual indicator for the user. For example, an oriented glyph may be used in data visualization to graphically indicate data values, such as an arrow indicating wind direction on a two-dimensional field or blood flow through an artery. However, oriented glyphs have not been used to assist a user in interacting with and manipulating an image in three dimensions.

SUMMARY OF THE INVENTION

One or more embodiments of the invention provide an oriented glyph that provides a direct visual indication of valid movement direction during direct manipulation of a three-dimensional geometric object.

A glyph is a symbol that conveys information non-verbally. An oriented glyph is a glyph that is designed to give some indication as to what action can be performed, and is oriented to a three-dimensional object to give some indication as to the direction that action will be constrained. A grip is a glyph that has a defined position and an active area within which a pointing device will "snap" to that position. Grip glyphs can be used on a three-dimensional model to indicate that an action can be performed and aid in the execution of that action. For example, a square glyph can be placed on the corner of a door, indicating that the grip can be used to interactively change the height or width of the door.

The benefit of an oriented grip glyph is that it improves usability by providing a direct visual indication of the valid movement direction during direct manipulation of the object. With prior art existing square grips, the user must first determine from the position of the grip what the resulting action will be, then the user must determine a valid direction constraint, usually by experimentation. Additionally, customized grip glyphs allow for a greater number of grips to be displayed on an object, because the user will be able to differentiate between the glyph shapes.

Non-oriented glyphs have been used extensively in two-dimensional graphic editing, and more recently in three-dimensional model editing. Oriented glyphs are used extensively in data visualization to graphically indicate data values, such as an arrow indicating wind direction on a two-dimensional field or blood flow through an artery. One or more embodiments of the invention bring these two characteristics together: using an oriented glyph to indicate a meaningful direction during user interaction.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 1:
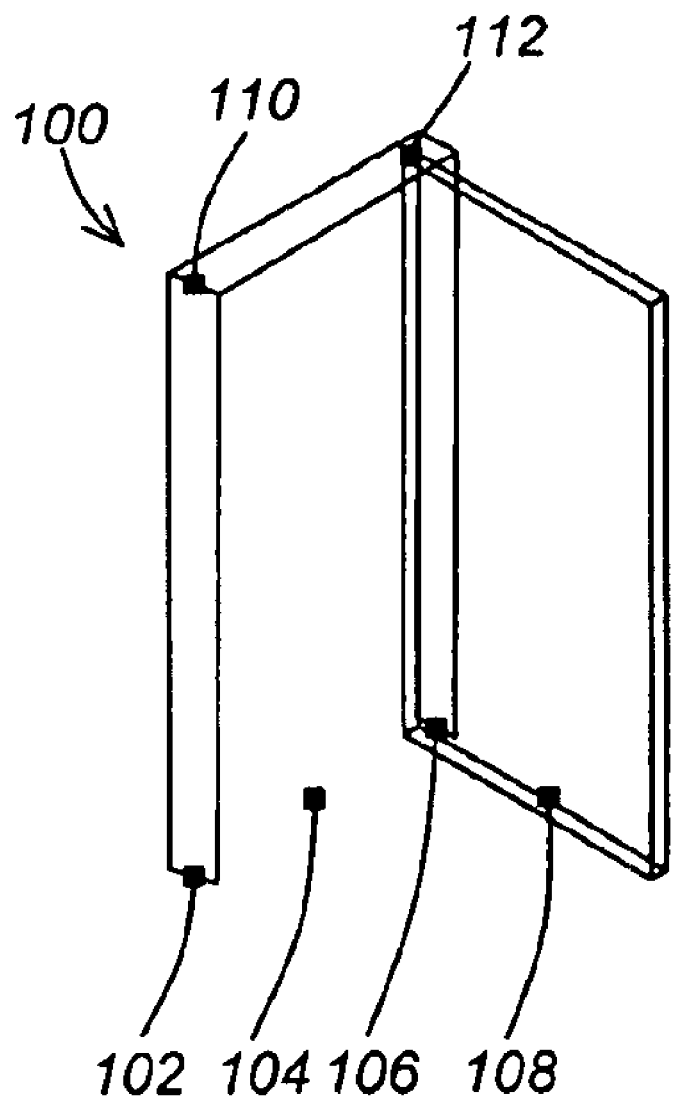
FIG. 1 illustrates grip glyphs as used in the prior art.
Figure 2:
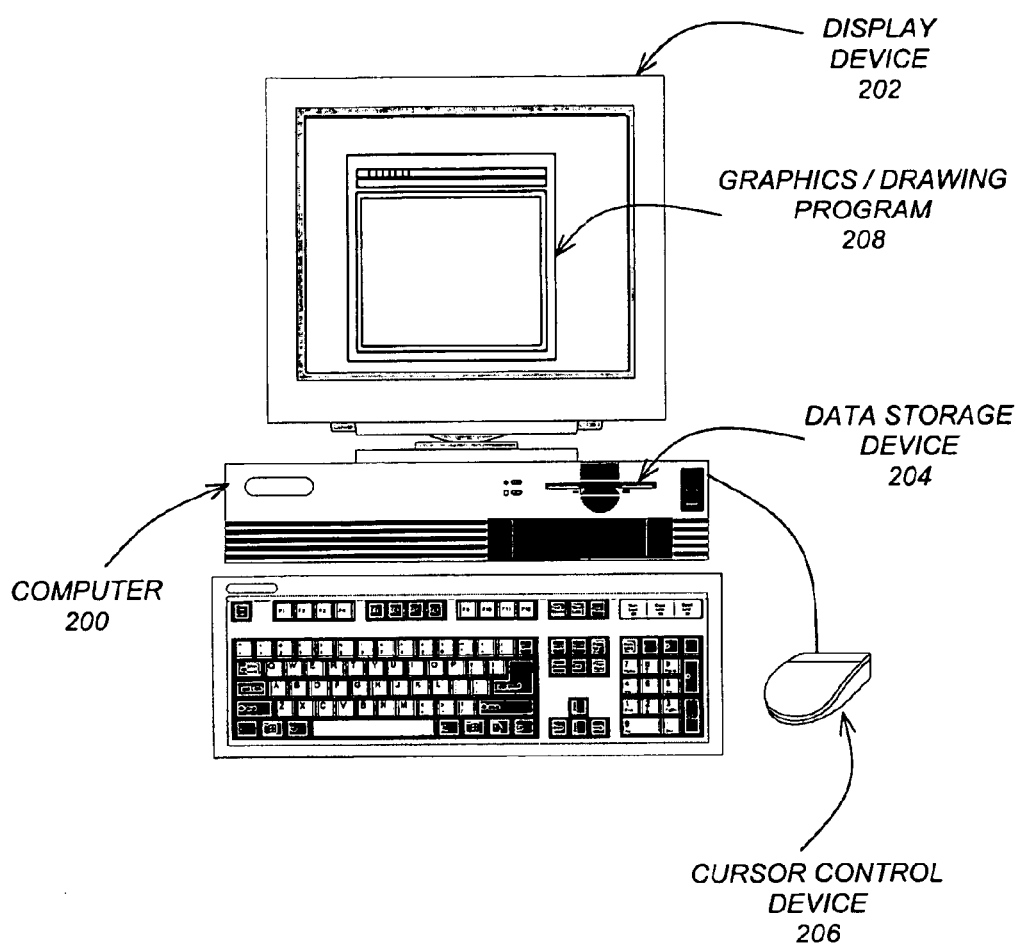
FIG. 2 is an exemplary hardware and software environment used to implement one or more embodiments of the invention.

FIG. 2 is an exemplary hardware and software environment used to implement one or more embodiments of the invention. Embodiments of the invention are typically implemented using a computer 200, which generally includes, inter alia, a display device 202, data storage devices 204, cursor control devices 206, and other devices. Those skilled in the art will recognize that any combination of the above components, or any number of different components, peripherals, and other devices, may be used with the computer 200.

One or more embodiments of the invention are implemented by a computer-implemented graphics program 208, wherein the graphics program 208 is represented by a window displayed on the display device 202. Generally, the graphics program 208 comprises logic and/or data embodied in or readable from a device, media, carrier, or signal, e.g., one or more fixed and/or removable data storage devices 204 connected directly or indirectly to the computer 200, one or more remote devices coupled to the computer 200 via a data communications device, etc.

Those skilled in the art will recognize that the exemplary environment illustrated in FIG. 2 is not intended to limit the present invention. Indeed, those skilled in the art will recognize that other alternative environments may be used without departing from the scope of the present invention.

Computer-Implemented Graphics Program

Figure 3:
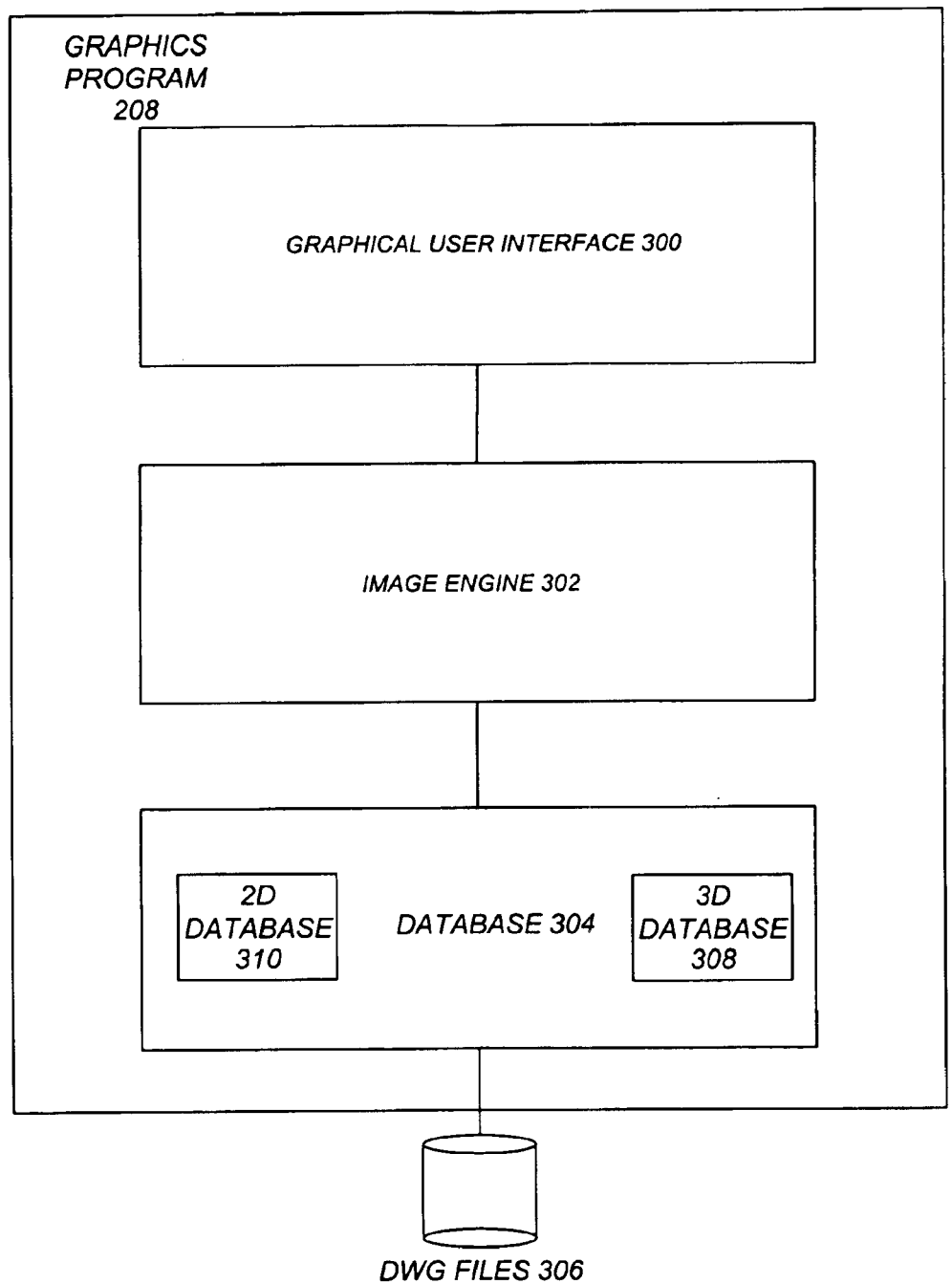
FIG. 3 is a block diagram that illustrates the components of a graphics program in accordance with one or more embodiments of the invention.

FIG. 3 is a block diagram that illustrates the components of the graphics program 208 according to the preferred embodiment of the present invention. There are three main components to the graphics program 208, including: a Graphical User Interface (GUI) 300, an Image Engine (IME) 302, and a DataBase (DB) 304 for storing objects in Drawing (DWG) files 306.

The Graphical User Interface 300 displays information to the operator and provides the functionality for the operator's interaction with the graphics program 208.

The Image Engine 302 processes the DWG files 306 and delivers the resulting graphics to the monitor 202 for display. In one or more embodiments, the Image Engine 302 provides a complete application programming interface (API) that allows other computer programs to interface to the graphics program 208 as needed.

The Database 204 is comprised of two separate types of databases: (1) a 3D database 308 known as the "3D world space" that stores 3D information; and (2) one or more 2D databases 310 known as the "2D view ports" that stores 2D information derived from the 3D information.

Software Embodiments

In one or more embodiments of the invention, graphical user interface 300 displays one or more glyphs that indicate an orientation and possible action to be taken in modifying a geometric entity in 3D space in the 2D viewport. With the glyphs, users are able to quickly and easily identify and select the appropriate glyph for executing a desired action.

Figure 4:
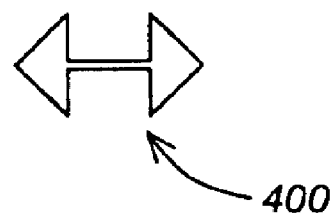
FIG. 4 illustrates an arrow glyph designed to indicate potential actions in accordance with one or more embodiments of the invention.

The glyphs of the present invention may comprise a variety of graphical forms as long as the graphical form provides an indication of valid movement direction. For example, a glyph may take the form of an arrow, an ellipse, a triangle, or alternative geometric shape. FIG. 4 illustrates an arrow glyph 400 that is designed to indicate potential actions. The glyph 400 has arrows that indicate valid movement direction during manipulation of a graphic object. When the arrow 400 is placed in three dimensional space, the orientation and direction of the arrows indicate how cursor movement will be constrained.

Figure 5:
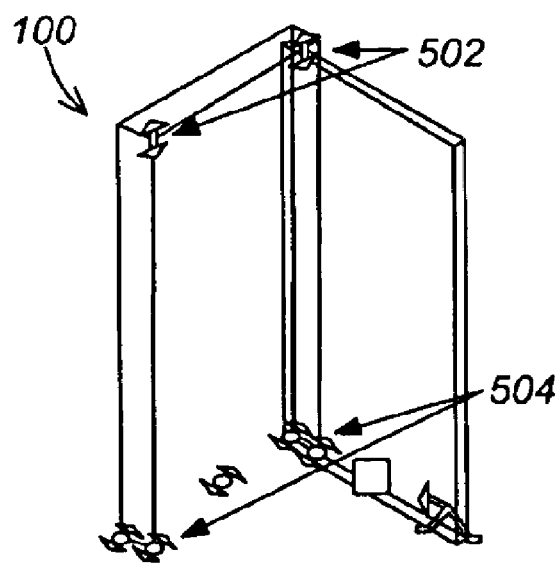
FIG. 5 illustrates the use of the arrow glyph of FIG. 4 in connection with a door object in different orientations in accordance with one or more embodiments of the invention.

FIG. 5 illustrates how the arrow glyph 400 may be used on a door object 100 in different orientations in accordance with one or more embodiments of the invention. As illustrated, grip glyphs 502 and 504 are oriented to visually indicate valid movement direction. Since the orientation reflects valid movement direction, when the orientation changes, the user may be able to easily and quickly determine how the glyphs 502 and 504 may be used. Thus, the orientation of grip glyphs 502 visually indicates the ability to change the height of door object 100. Similarly, the orientation of grip glyphs 504 visually indicate the ability to change the width of door object 100.

Figure 6:
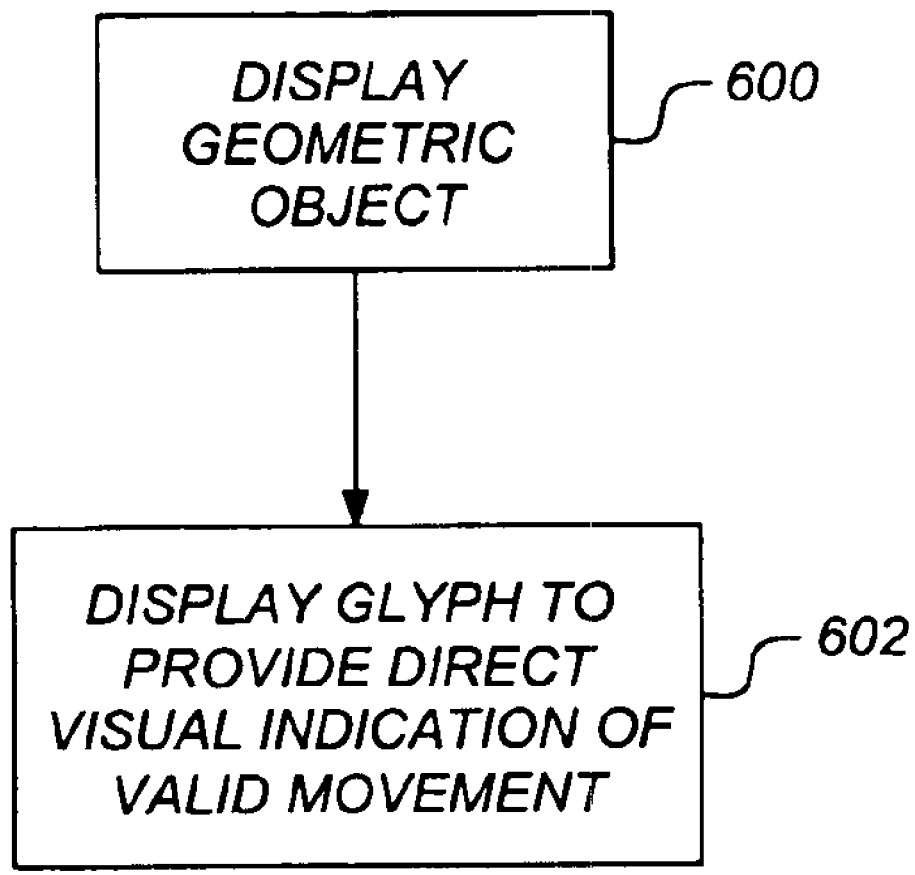
FIG. 6 is a flow chart illustrating the use of a three-dimensional glyph in accordance with one or more embodiments of the invention.

FIG. 6 is a flow chart illustrating the use of a three-dimensional glyph in accordance with one or more embodiments of the invention. At step 600, a three-dimensional geometric object is displayed in a computer drawing program 208. At step 602, a first oriented three-dimensional glyph is displayed. The first oriented three-dimensional glyph provides a direct visual indication of valid movement direction during direct manipulation (e.g., through user interaction) of the three-dimensional geometric object.

The valid movement direction may be a constraint on a permissible action. Further, an orientation and direction of the glyph may indicate how cursor movement will be constrained. As described above, the first oriented three-dimensional glyph may be a grip that has a defined position and an active area within which a pointing device will "snap" to that position. Multiple glyphs may also be displayed, both oriented and non-oriented. When multiple glyphs are displayed, they may be differentiable based on their orientation and direction.

Subsequent to displaying one or more glyphs, a user may manipulate a graphical object using the glyph. The user first selects the glyph (e.g., using a cursor control device 206). Once selected, the user may directly manipulate the graphical object in the valid movement direction. For example, the cursor may be dragged (using the cursor control device 206) to stretch an object in one of the valid directions indicated by the glyph.

Thus, referring to FIG. 5, if the user desires to modify the height of door object 100, the user can quickly and easily identify that glyphs 502 may be used to perform the modification. Accordingly, the user selects a glyph 502, and while holding down the cursor control device 206 drags the cursor control device 206 in an upward or downward direction. Such drag movement changes the height of door object 100 based on the movement. The cursor movement is unconstrained, but the results of the cursor movement may be constrained based on the direction indicated by the oriented grip. Once the desirable height modification has been reached, the user may merely let go of the cursor control device 206 button.

Thus, the user may quickly and easily determine the appropriate tool (i.e., glyph) to utilize to perform a desired action based on the visual appearance of the glyph. The appropriate tool is then selected and used to perform an action.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention. In summary, embodiments of the invention provide a three-dimensional glyph that provides a direct visual indication of valid movement direction during direct manipulation of a three-dimensional geometric object.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for indicating available modifications to a geometric object in a computer drawing program, comprising:

accepting, from a user, placement of a user-selected three-dimensional (3D) geometric object in a computer drawing program; and simultaneously displaying a first oriented 3D grip glyph directly on the 3D geometric object and a second oriented 3D grip glyph directly on the 3D geometric object; wherein the first oriented 3D grip glyph and the second oriented 3D grip glyph provide direct visual indications of valid movement directions during direct manipulation of the three-dimensional geometric object using the grip glyphs.

2. The method of claim 1 wherein the valid movement directions are constraints on permissible actions.

3. The method of claim 1 wherein the first oriented three-dimensional glyph is a grip that has a defined position and an active area within which a pointing device will "snap" to that position.

4. The method of claim 1 wherein an orientation and direction of the first oriented three-dimensional glyph indicate how cursor movement will be constrained.

5. The method of claim 1, wherein the second oriented three-dimensional grip glyph it differentiable from the first oriented three-dimensional grip glyph.

6. The method of claim 1 wherein the direct manipulation occurs through user interaction with the computer drawing program.

7. The method of claim 1 further comprising manipulating the three-dimensional object based on direct manipulation of the first oriented three-dimensional glyph in the valid movement direction.

8. A system for indicating available modifications to a geometric object in a computer drawing program comprising:

(a) a computer system having a memory and a data storage device coupled thereto;

(b) a drawing program executing on the computer system, the drawing program configured to:

(i) accept, from a user, placement of a user-selected three-dimensional geometric (3D) object; and (ii) simultaneously display a first oriented 3D grip glyph directly on the 3D geometric object and a second oriented 3D grip glyph directly on the 3D geometric object, wherein the first oriented 3D grip glyph and the second oriented 3D grip glyph provide direct visual indications of valid movement directions during direct manipulation of the three-dimensional geometric object using the grip glyphs.

9. The system of claim 8 wherein the valid movement directions are a constraint on permissible actions.

10. The system of claim 8 wherein the first oriented three-dimensional glyph is a grip that has a defined position and an active area within which a pointing device will "snap" to that position.

11. The system of claim 8 wherein an orientation and direction of the first oriented three-dimensional glyph indicate how cursor movement will be constrained.

12. The system of claim 8 wherein the second oriented three-dimensional glyph is differentiable from the first oriented three-dimensional glyph.

13. The system of claim 8 wherein the direct manipulation occurs through user interaction with the computer drawing program.

14. The system of claim 8 wherein the drawing program is further configured to manipulate the three-dimensional object based on direct manipulation of the first oriented three-dimensional glyph in the valid movement direction.

15. An article of manufacture comprising a program storage medium readable by a computer and embodying one or more instructions executable by the computer to perform a method for indicating available modifications to a geometric object in a computer drawing program, the method comprising:

accepting, from a user, placement of a user-selected three-dimensional (3D) geometric object; and simultaneously displaying a first oriented 3D grip glyph directly on the 3D geometric object and a second oriented 3D grip glyph directly on the 3D geometric object, wherein the first oriented 3D grip glyph and the second oriented 3D grip glyph provide direct visual indications of valid movement directions during direct manipulation of the three-dimensional geometric object using the grip glyphs.

16. The article of manufacture of claim 15 wherein the valid movement directions are a constraint on permissible actions.

17. The article of manufacture of claim 15 wherein the first oriented three-dimensional glyph is a grip that has a defined position and an active area within which a pointing device will "snap" to that position.

18. The article of manufacture of claim 15 wherein an orientation and direction of the first oriented three-dimensional glyph indicate how cursor movement will be constrained.

19. The article of manufacture of claim 15, wherein the second oriented three-dimensional glyph is differentiable from the first oriented three-dimensional glyph.

20. The article of manufacture of claim 15 wherein the direct manipulation occurs through user interaction with the computer graphics program.

21. The article of manufacture of claim 15 wherein the method further comprises manipulating the three-dimensional object based on direct manipulation of the first oriented three-dimensional glyph in the valid movement direction.

* * * * *

UNITED STATES PATENT AND TRADEMARK OFFICE
CERTIFICATE OF CORRECTION

| | |
|---|---|
| PATENT NO. | : 7,046,241 B2 |
| APPLICATION NO. | : 10/020350 |
| DATED | : May 16, 2006 |
| INVENTOR(S) | : Arvin |

It is certified that error appears in the above-identified patent and that said Letters Patent is hereby corrected as shown below:

Column 5:

Claim 5, line 42, please delete "it" and insert --is--.

Signed and Sealed this

Twenty-sixth Day of October, 2010

David J. Kappos
*Director of the United States Patent and Trademark Office*